11/3/87 OR 4,704,004

United States Patent [19]
Nosker

[11] Patent Number: 4,704,004
[45] Date of Patent: Nov. 3, 1987

[54] LIGHT BOX HAVING A FRESNEL LENS

[75] Inventor: Richard W. Nosker, Princeton, N.J.

[73] Assignee: RCA Corporation, Princeton, N.J.

[21] Appl. No.: 890,476

[22] Filed: Jul. 30, 1986

[30] Foreign Application Priority Data

Feb. 1, 1986 [GB] United Kingdom ................. 8600021

[51] Int. Cl.$^4$ ................................................. G02F 1/13
[52] U.S. Cl. ................................. 350/345; 350/339 R
[58] Field of Search ............... 350/339 R, 345, 452; 362/223

[56]  References Cited
U.S. PATENT DOCUMENTS

| 659,353 | 10/1900 | Pitkin | 350/452 |
|---|---|---|---|
| 1,393,573 | 10/1921 | Ritter | 350/452 |
| 3,653,138 | 4/1972 | Cooper | 350/345 X |
| 3,840,695 | 10/1974 | Fischer | 358/61 |
| 4,171,874 | 10/1979 | Bigelow et al. | 350/345 |
| 4,185,895 | 1/1980 | Stephens et al. | 350/345 |
| 4,330,813 | 5/1982 | Deutsch | 362/244 |
| 4,334,734 | 6/1982 | Hareng et al. | 350/345 X |
| 4,487,481 | 12/1984 | Suzawa | 350/345 |
| 4,502,761 | 3/1985 | Knoll et al. | 350/345 |

FOREIGN PATENT DOCUMENTS 59-155829  9/1984  Japan .................................. 350/345

Primary Examiner—Stanley D. Miller
Assistant Examiner—Richard F. Gallivan
Attorney, Agent, or Firm—Eugene M. Whitacre; Dennis H. Irlbeck; Lester H. Hallacher

[57]  ABSTRACT

A light box comprises a source of light, a reflector and a Fresnel lens. The lens provides nearly constant illumination of an object such as a liquid crystal cell by collimating light parallel to a normal to the cell. Thus the cell will exhibit a nearly uniform electro-optical response. The reflector preferably is parabolic, while the light source preferably is a line source such as a fluorescent tube.

13 Claims, 3 Drawing Figures

LIGHT BOX HAVING A FRESNEL LENS

BACKGROUND OF THE INVENTION

The present invention relates to a light box, and more particularly, to one that uses a Fresnel lens to achieve a uniform output light pattern.

A typical prior art light box 10 is shown in FIG. 1 and comprises a light source 12 disposed at the focus of a parabolic reflector 14 having an aperture 16. A central ray 20, emitted from the source 12, together with other rays (not shown) that are nearly at the same angle as the ray 20 result in a lobe (polar plot of light intensity) 21 that is perpendicular to the aperture 16. A ray 22 that is reflected by the reflector 14 near the edge of the aperture 16 results in a lobe 24 that is perpendicular to the aperture 16. A ray 26 that just misses being reflected results in a lobe 28 that is not perpendicular to the aperture 16. The lobes 24 and 28 have an angle $\theta$ therebetween. Similarly, a ray 30 that is reflected by the reflector 14 near the opposed edge of the aperture 16 results in a lobe 32 that is perpendicular to the aperture 16. A ray 34 that just misses being reflected results in a lobe 36 that is not perpendicular to the aperture 16. The lobes 32 and 36 also have an angle $\theta$ therebetween. A similar effect occurs at other positions along the aperture 16 intermediate the center and edges thereof.

As described in U.S. patent application No. 784,960, filed Oct. 7, 1985, the best viewing characteristics for a twisted nematic liquid crystal display cell are obtained when the principal viewing plane of the liquid crystal cell is oriented in the plane of FIG. 1 where the principal viewing plane is defined as the plane containing the director of the liquid crystal material at the midpoint of the liquid crystal cell and the normal to the cell surface through which light enters the cell, which is preferably oriented parallel to the ray 20. When the double-lobed radiation patterns 24, 28, and 32, 36 at the aperture 16 of the box 10 pass directly through a liquid crystal cell, the net electro-optic curves, which describe the change in transmitted light as a function of the applied voltage, at opposed edges of the cell will be very different from one another. This is due to the fact that the averages of the lobes everywhere but at the center are at positive or negative angles in the principal viewing plane of the cell. By positive and negative angles is meant that the rays between the rays 20 and 34 form an angle extending in one direction, while the rays between the rays 20 and 26 form an angle extending in the opposite direction.

Therefore, a voltage intended to produce, e.g. a uniform gray over the cell, would give rise to gray at the center of the cell, but to a darker gray at one edge and a lighter gray at the other. This would make the display look particularly poor, especially where two or more adjacent light boxes are required for large displays since then a relatively black area of a cell will be adjacent to a relatively white area of the cell. An absorbing means could be provided for the nonreflected rays to obtain uniform collimation; however, this would not be an efficient use of the light from the light source and result in a decrease in emittance away from the center.

It is therefore desirable to have a light box that efficiently provides substantially uniform collimation and emittance.

SUMMARY OF THE INVENTION

A light box comprises a source of light, a reflector disposed adjacent said source and having an aperture, and a Fresnel lens disposed adjacent the aperture of said reflector.

BRIEF DESCRIPTION OF THE DRAWING

Corresponding reference numerals have been used on corresponding elements.

DETAILED DESCRIPTION OF THE PREFERRED EMBODIMENTS

Figure 1:
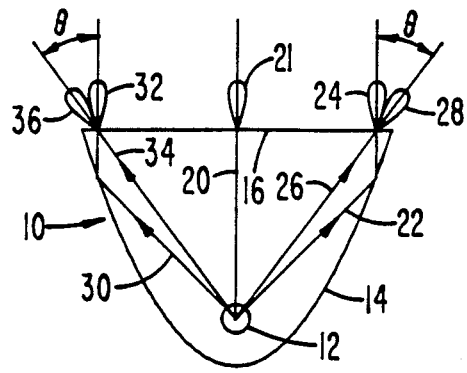
FIG. 1 is a block diagram of a prior art light box.
Figure 2:
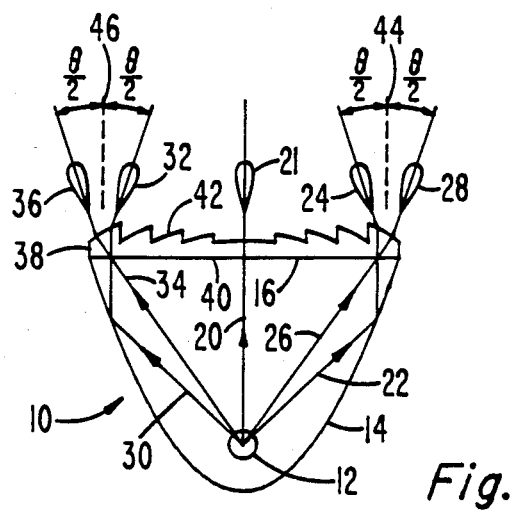
FIG. 2 is a block diagram of a light box in accordance with the invention.

FIG. 2 is similar to FIG. 1 except that a linear Fresnel field lens 38 is disposed adjacent the aperture 16 of the reflector 14. As known in the art, such a lens typically comprises a flat side 40 and a serrated side 42. By linear is meant that the serrations extend in a straight line perpendicular to the plane of FIG. 2. Although only eight serrations are shown for clarity, in practice many more serrations are typically used. The number of serrations is chosen so that the lobes from adjacent serrations have nearly the same angular distribution. In general, the smaller the effective emitting diameter of the line source 12, the larger the number of serrations required. The lens comprises a transparent material such as glass or an acrylic plastic such as poly (methylmethacrylate) that is substantially birefringence free and preferably also inexpensive and light in weight.

Referring to FIG. 2, the ray 20 that passes through the center of the lens 38 is not affected thereby. However, the rays 22 and 26 are refracted by the serrated surface 42 counterclockwise by an angle $\theta/2$ as compared to their paths in FIG. 1 such that the center line 44 therebetween is now aligned parallel to the ray 20 and normal to the aperture 16. Similarly, the rays 30 and 34 are refracted by the serrated surface 42 clockwise by an angle $\theta/2$ as compared to their paths in FIG. 1 such that their center line 46 is also parallel to the ray 20. Rays that are between the central ray 20 and the edge of the aperture 16 are rotated by an angle smaller than $\theta/2$. In particular, the closer the ray is to the ray 20, the smaller the rotation angle. Thus substantially uniform collimation and efficient emittance is provided by the light box 10 by making use of the non-reflected light such as the rays 26 and 34, even though the angular distribution of the lobes away from the center do not exactly match the angular distribution of the lobe 21 at the center.

Figure 3:
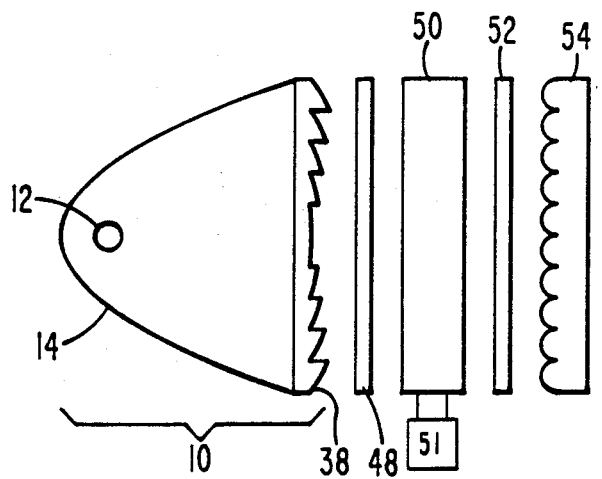
FIG. 3 is a block diagram of a liquid crystal display incorporating the light box of FIG. 2.

FIG. 3 shows a display including the light box 10 and the Fresnel lens 38, a means for polarizing light 48, a means for changing the polarization of light 50 that provides a symmetric electro-optic response above and below the plane of FIG. 3, such as a liquid crystal cell, a means for analyzing the polarization of light 52, and a means for diffusing light 54 to provide a wide viewing angle in the plane of FIG. 3. If a wide viewing angle is not required, then the diffusing means 54 can be disposed between the light source 12 and the polarization changing means 50. In this case only a slight diffusion of the light may be required to render invisible structure or defects, e.g. the serrated surface 42, nonuniformity of the light source 12 or the reflector 14.

The light source 12 comprises a line source such as a fluorescent tube. The reflector 14 preferably comprises a cylindrical parabolic reflector that partially collimates light from the tube 12 in the plane of FIG. 3 and does not collimate in a direction perpendicular thereto. The polarizing and analyzing means 13 and 14, respectively, each comprise a sheet polarizer such as type HN32 made by the Polaroid Corp., Cambridge, Mass.

The cell 50 is typically a conventional twisted nematic liquid crystal cell and comprises a pair of transparent opposing substrates (not shown), such as glass, having pixel patterned transparent electrodes (not shown), such as tin oxide or indium tin oxide of about 100 nanometers (nm) thickness, and liquid crystal alignment layers (not shown), such as a polyimide of about 100 nm thickness, thereon and a liquid crystal material preferably of the twisted nematic type, such as Type No. ZLI-1800-000 or ZLI-2293 made by E. Merck, Inc. Darmstadt, West Germany, therebetween, all as known in the art. An electrical means 51 applies electrical signals to the electrode pixels in accordance with a desired image to be displayed. Alternatively, the cell 50 can incorporate a ferroelectric or magnetoelectric material.

The diffusing means 54 preferably comprises a linear diffuser, i.e. one dimensional, such as a cylindrical lenticular array, since it will diffuse light in the plane of FIG. 3 and not in a direction perpendicular thereto. This increases the viewing angle in the plane of FIG. 3.

EXAMPLE

For a light source 12 centered about 0.8 cm from the base of the reflector 14 having an aperture of about 8.5 cm and a depth of 5.7 cm, the angle $\theta$ was about 40 degrees. The desired focal length of the Fresnel lens is about 30.6 cm to achieve a lobe rotation at the edges of the aperture 16 of $\theta/2$ or about 20 degrees. When used with a twisted nematic liquid crystal cell and two stacked half-cylinder lenticular diffusers to achieve the required amount of diffusion, this apparatus provided visually uniform illumination with a viewing angle in all directions of about 45 degrees and a contrast (white-to-black intensity) ratio of about 20:1 as measured using a Model No. 1980A Spectra Pritchard photometer.

COUNTER EXAMPLE

An identical apparatus without a Fresnel lens was visually very non-uniform with negative images forming at viewing angles of less than 30 degrees.

What is claimed is:
1. A light box comprising:
    a source of light comprising a line source;
    a reflector disposed adjacent said source and having an aperture; and
    a Fresnel lens disposed adjacent said aperture of said reflector.
2. The light box of claim 1 wherein said line source comprises a fluorescent tube.
3. The light box of claim 1 wherein said reflector comprises a cylindrical parabolic reflector.
4. The light box of claim 1 wherein said lens comprises an acrylic plastic.
5. The light box of claim 4 wherein said plastic comprises poly(methylmethacrylate).
6. The light box of claim 1 wherein said lens substantially collimates light from said source and said reflector in one plane.
7. A display comprising:
    a source of light;
    a reflector disposed adjacent said source and having an aperture;
    a Fresnel lens disposed adjacent the aperture of said reflector;
    means for polarizing light disposed adjacent said lens;
    means for changing the polarization of light disposed adjacent said polarizing means; and
    means for analyzing the polarization of light passing through said polarization changing means.
8. The display of claim 7 wherein said lens collimates light in a direction parallel to a normal to a surface through which light enters said polarization changing means.
9. The display of claim 7 wherein said polarizing means and said analyzing means each comprise a sheet polarizer.
10. The display of claim 7 wherein said polarization changing means comprises a liquid crystal cell.
11. The display of claim 10 wherein said cell includes a twisted nematic liquid crystal material.
12. The display of claim 7 further comprising means for diffusing light disposed adjacent said analyzing means.
13. The display of claim 12 wherein said diffusing means comprises a cylindrical lenticular array.

* * * * *

UNITED STATES PATENT AND TRADEMARK OFFICE
CERTIFICATE OF CORRECTION

PATENT NO. : 4,704,004

DATED : November 3, 1987

INVENTOR(S) : Richard William Nosker

It is certified that error appears in the above-identified patent and that said Letters Patent is hereby corrected as shown below:

On the cover sheet of the patent under number (30) Foreign Application Priority Data the date should be January 2, 1986 NOT February 1, 1986.

Signed and Sealed this

Fourth Day of October, 1988

Attest:

DONALD J. QUIGG

Attesting Officer

Commissioner of Patents and Trademarks